United States Patent [19]

LoCodo

[11] Patent Number: 4,669,946
[45] Date of Patent: Jun. 2, 1987

[54] TOWING DEVICE FOR VEHICLES

[76] Inventor: Jim LoCodo, 136 Las Junta Way, Walnut Creek, Calif. 94596

[21] Appl. No.: 764,306

[22] Filed: Aug. 12, 1985

[51] Int. Cl.⁴ .............................................. B60P 3/12
[52] U.S. Cl. ................................... 414/563; 180/198; 280/402
[58] Field of Search .............. 414/563, 426, 434, 338, 414/427, 428, 429, 430; 280/402; 180/198

[56] References Cited

U.S. PATENT DOCUMENTS

| | | | |
|---|---|---|---|
| 2,482,383 | 9/1949 | Traverso | 414/528 X |
| 2,569,050 | 9/1951 | Gref et al. | 214/85 |
| 2,782,076 | 2/1957 | Miller | 414/429 X |
| 3,157,267 | 11/1964 | Asbury | 414/528 X |
| 3,547,290 | 12/1970 | Fratzke et al. | 214/506 |
| 3,613,921 | 10/1971 | Ryden et al. | 414/430 X |
| 3,924,763 | 12/1975 | Pigeon | 214/86 A |
| 3,929,237 | 12/1975 | Schaedler | 414/563 |
| 4,036,384 | 7/1977 | Johnson | 214/334 |
| 4,225,279 | 9/1980 | Boyer | 414/428 |
| 4,451,193 | 5/1984 | Cannon, Jr. et al. | 414/563 |
| 4,473,334 | 9/1984 | Brown | 414/563 |

FOREIGN PATENT DOCUMENTS 878621  11/1981  U.S.S.R. .............. 280/402

Primary Examiner—Joseph E. Valenza
Assistant Examiner—Stuart J. Millman
Attorney, Agent, or Firm—Majestic, Gallagher, Parsons & Siebert

[57] ABSTRACT

A tow basket for use in towing a vehicle. The wheels of the vehicle to be towed are lifted onto the tow basket as the basket approaches and contacts the vehicle wheels. In a preferred embodiment, the vehicle wheel is lifted by a conveyor belt onto a first roller and thus carried upwards and into the tow basket, the first roller being operatively connected to the supporting wheels of the tow basket, and the belt being superposed around and upon a plurality of rollers including the first roller. As the vehicle is lifted, a pivoting structure within the tow basket pivots with the shifting weight of the vehicle from an initial position to a final position where the wheel is securely retained. In an alternative embodiment, a novel connection is provided between the tow truck boom and a cross bar having a tow basket slidably mounted on either end; the connection provides for some degree of lateral movement during loading and unloading so that the vehicle may be loaded from or unloaded onto an uneven surface. The tow basket may be put to other uses as well, e.g. as a dolly or on a car carrier.

4 Claims, 3 Drawing Figures

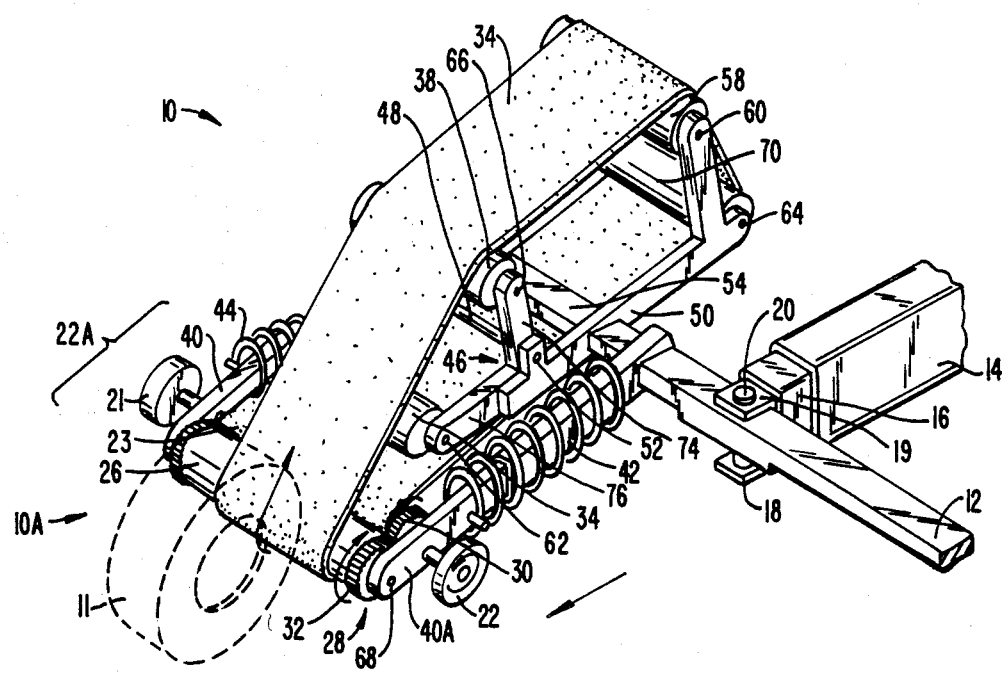
FIG._1.

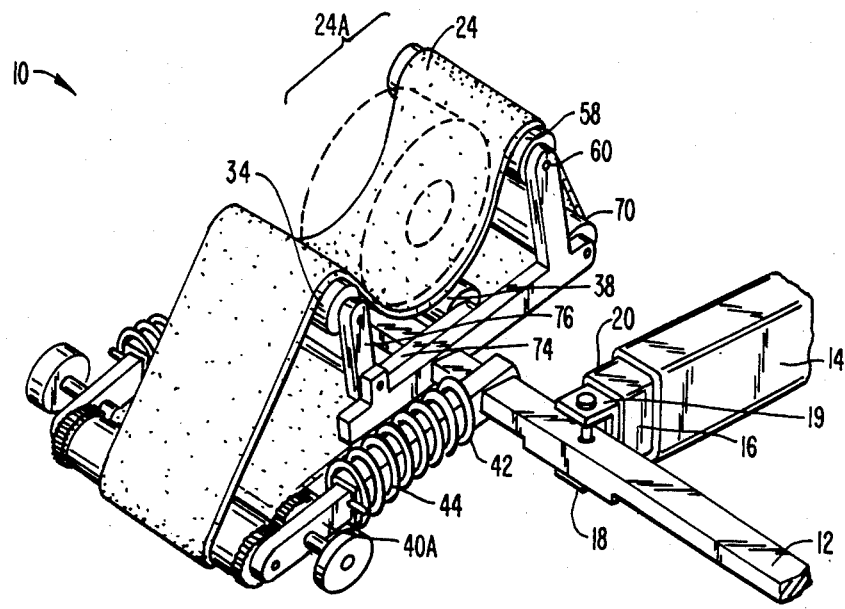
FIG._2.
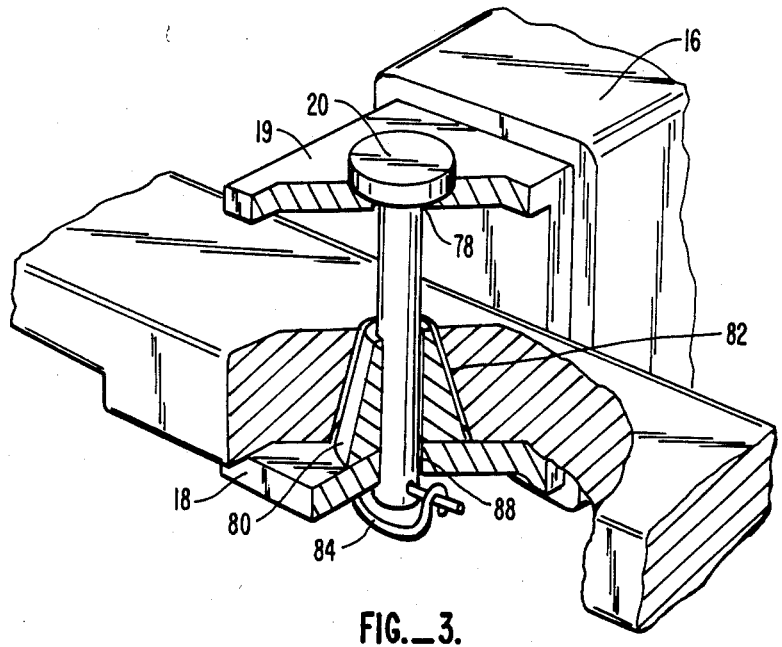
FIG._3.

TOWING DEVICE FOR VEHICLES

FIELD OF THE INVENTION

The invention relates generally to towing devices, and in particular relates to a novel apparatus and method for lifting, securing, and towing a vehicle by its wheels.

BACKGROUND OF THE INVENTION

A variety of towing devices are known for towing disabled vehicles such as passenger cars or trucks. Specialized tow trucks sometimes include an overhead boom from which a sling or cradle attachable to the stalled vehicle depends, and are quite popular commercially. Multi-purpose flat bed trucks, which may be adapted for temporary towing purposes, are also known.

Although sling lifted tow trucks are widely used, attachment of the two bar and sling to the vehicle frame or suspension is a dirty task, and as the lifting point of the disabled vehicle is near its front or rear bumper, damage such as denting or twisting to vehicle components is a frequent occurrence. Such damage has been increasing as more plastic parts and shock-collapsible bumpers have been incorporated into passenger cars.

Those tow trucks which utilize a "wheel lift" apparatus usually attach to the front or rear wheels of the vehicle to be towed. However, such tow trucks carry a much higher portion of the towed vehicle's weight than when the lifting point is adjacent the towed vehicle bumper. Thus, although a wheel-lift two truck (which picks up the vehicle to be towed by its wheel, and in which the lifting point is closer to the center of the towed car as compared with a sling-lifted two truck) provides relatively clean attachment and greatly reduces the chances of damage to the towed vehicle, instability of the towed load in transit during acceleration and deceleration and instability of the towing truck due to longitudinal tire load transfer have been problems.

Examples of different types of towing devices may be seen in the following patents: U.S. Pat. Nos. 4,473,334 to Brown; 3,924,763 to Pigeon; and 3,547,290 to Fratzke et al. A number of problems and complications have been encountered, however, with many prior art towing devices. First, it is obviously desirable to remove disabled vehicles from roadways quickly and efficiently. Many prior art devices, however, require that time-consuming physical work be done by the driver, e.g. in securing the vehicle wheels or in engaging extra attachments. Second, a number of prior art devices do not easily adjust to different tire sizes, flat or missing tires, vehicles of varying widths, vehicles in potholes or against curbs, etc. Third, replacement parts have been expensive. Fourth, damage to the vehicle during both attachment and towing resulting from undesirable forces on the vehicle frame is not unlikely. Finally, because of the complexity of many prior art towing devices, driver training may be lengthy and complicated.

There is thus a need in the art for a versatile towing device which will eliminate the aforementioned problems while providing for ease and efficiency in towing. The apparatus and method of the present invention are addressed to this need, and provide a versatile, fast, and substantially foolproof towing device designed to substantially reduce the time, labor, and risk involved in towing.

OBJECTS OF THE INVENTION

Accordingly, it is an object of the present invention to provide an apparatus for towing vehicles, which apparatus can be used to quickly and efficiently lift and secure a vehicle by its wheels.

It is another object of the present invention to provide an apparatus for towing vehicles, which apparatus is comprised of relatively uncomplicated component parts, is inexpensive to repair, is relatively easy to manufacture, and does not require any extra attachments during use.

It is a further object of the invention to provide an apparatus for towing vehicles, which apparatus secures the wheels of a vehicle while lifting, without additional time or labor.

It is still another object of the present invention to provide an apparatus for towing vehicles, which apparatus substantially reduces the time and effort spent by the tow truck driver in securing the vehicle to be towed.

It is yet another object of the present invention to provide an apparatus for towing vehicles, which apparatus substantially reduces the time spent in driver training.

It is a further object of the present invention to provide an apparatus for towing vehicles, which apparatus automatically and easily adjusts to different size tires, different vehicle positions, such as against a curb or in a pothole, different vehicle widths, and flat or missing tires.

It is still a further object of the present invention to provide an apparatus for towing vehicles, which apparatus substantially reduces the likelihood of damage to a vehicle by compensating for changes in the grade of the road during towing.

It is yet a further object of the present invention to provide a quick and efficient method of towing vehicles such that driver time and effort is substantially reduced.

Further objects and advantages of the invention will become apparent from the study of the following description and attached drawings.

SUMMARY OF THE INVENTION

In a preferred embodiment of the present invention, a two basket is situated at either end of a cross bar operatively attached to the rearward end of a tow truck, and is used as a wheel-retaining means in towing a vehicle. The tow basket incorporates within its structure a means for lifting the wheels of a vehicle to be towed, which lifting means is operably engaged by a ground engaging means on which the tow basket rests. As the vehicle is lifted, a pivoting structure within the tow basket pivots with the shifting weight of the vehicle from an initial position toward a final position where the wheel is securely retained. The tow baskets provide a mechanism by which the vehicle weight may be retained close to the body of the tow truck, thus substantially reducing the likelihood of damage to the vehicle. And, while the tow basket may be put to a number of uses, its primary use is as such a wheel-retaining means for use in towing or carrying a vehicle.

BRIEF DESCRIPTION OF THE DRAWINGS

FIG. 1 is a perspective view of the tow basket in its initial position.

FIG. 2 is a perspective view of the tow basket in its final position wherein a vehicle wheel is securely retained.

FIG. 3 is a partially cross-sectional view of the pivotable connection between the tow truck boom and the bar on which the tow baskets are situated.

DETAILED DESCRIPTION OF THE PREFERRED EMBODIMENT

Broadly, and referring to FIG. 1, the invention is an apparatus for lifting and securing the wheel of a vehicle to be towed, and includes a tow basket 10 having a front end 10A positioned toward the vehicle wheel 11 (shown in phantom) when loading, and a rearward end mounted on cross bar 12. The tow basket further includes lifting means 22A which lifts the vehicle wheel onto the tow basket, pivoting means 46 which is preferably an angular frame, and retaining means 24A (shown in FIG. 2) for maintaining the wheel in a secured position during towing. While the tow basket may be put to a number of uses, e.g. as a dolly or on a car carrier, its primary use is as a wheel retaining means for use in towing a car.

In a preferred embodiment, then, tow baskets are slidably mounted on either end of cross bar 12, thus providing for easy adjustment to varying vehicle widths. Cross bar 12 is connected at right angles to a boom 14 which is rearwardly extendible from the body of a tow truck (not shown). As the boom is extended toward a central point between either the front wheels or the rear wheels of a vehicle to be towed, tow baskets 10 approach the vehicle wheels.

As the vehicle to be towed is loaded, the tow baskets are lowered onto ground engaging means 22, preferably support wheels located at the front end 10A of the tow baskets, and rolled toward the vehicle. As each basket is caused to approach and contact each tire, the vehicle is lifted onto conveyor belt 24 and over first roller 26. Lifting means 22A includes a plurality of rollers 26, 34, 38, 58, and 70, including first roller 26 rotatably mounted on front end 10A and drive shaft 23, and is operatively connected to ground engaging means 22. As may be seen, lifting means 22A comprises a gear arrangement 28 by which ground engaging means 22 operably controls the rotation of first roller 26 and conveyor belt 24 superposed around tow basket 10. Ground engaging means 22 is preferably a wheel positioned at inner end 23A of shaft 23 and may optionally include a second wheel 21 positioned adjacent outer shaft 40. Roller 26 and shaft 23 are operably connected by means of interlocking sets of teeth 30 and 32, respectively, thus forming a drive mechanism. As the tow baskets approach and contact the vehicle, the vehicle wheels are caused to move upward and into the tow baskets as follows. Viewing the tow baskets from a position between the two baskets, ground engaging means 22 causes second shaft 23 to roll counterclockwise towards the vehicle as the tow baskets are rolled toward the vehicle, which by means of the aforementioned gear arrangement causes first roller 26 to roll clockwise, away from the vehicle, thus lifting the vehicle wheel onto conveyor belt 24. Additional force is provided by means of hydraulic extension of outer boom 14 toward the vehicle to be towed, thus "pushing" the tow baskets into the vehicle wheels.

As each vehicle wheel is lifted into the tow basket, it is, as stated above, initially lifted over first roller 26. It is then lifted over third roller 34 and further upwards on conveyor belt 24 toward fourth roller 38. As the vehicle wheel approaches fourth roller 38, frame 46 gradually pivots rearwards toward the tow truck, while inner and outer shafts 40 and 40A gradually slide into hollow tubes 42, thus compressing the entire structure to allow for slack in belt 24. Springs 44, which maintain helical tension within the tow basket, compress as well. Pivoting frame 46 is an angular structure having initially vertical support members 74 connected at right angles to initially horizontal support members 76. Rod 48 extends between the two areas at which the support members are perpendicularly connected, and is held in place by fastener means 52 such as a screw. Rollers 34 and 38 may be seen to parallel the support rod at either end of the frame, and are similarly disposed on rotatable shafts 62 and 66, respectively.

Referring now to FIG. 2, that illustration shows the tow basket after pivoting of frame 46 from the initial position illustrated in FIG. 1 to a final position in which the vehicle wheel is securely retained. The vehicle wheel is secured between third roller 34 and fifth roller 58 on conveyor belt 24. The towed wheel is thus retained between rollers 34 and 58 which are approximately level with the wheel midpoint; roller 58 secures the wheel during deceleration. The weight of the towed wheel is preferably close to or on roller 38. Frame 46 has pivoted 90° with the weight of the vehicle, so that initially vertical support members 74 now rest horizontally on extension 54 of cross bar 12, and initially horizontal support members 76 are now vertical. Frame members 50 are disposed within the same plane as extension 54 and at right angles thereto. Sixth roller 70 is retained between frame members 50 by means of rotatable shaft 64. Extending upwardly and perpendicularly from frame members 50 are support columns 56, between which fifth roller 58 is disposed by means of rotatable shaft 60.

FIG. 3 illustrates the novel connection between outer boom 14 and cross bar 12. Inner boom 16 extends from outer boom 14 towards cross bar 12 and is connected perpendicularly thereto, maintaining upper support plate 19 and lower support plate 18 in substantially parallel positions on either side of bar 12. Lower plate 18 is provided with a raised, generally conical structure 80 adapted to fit within corresponding substantially conical cavity 82 located on bar 12. After assembly of the cross bar 12 between plates 18 and 19, pin 20 is inserted through generally circular aperture 78 in upper plate 19, and further through generally cylindrical passageway 88 in conical structure 80. Fastener 84 is inserted through passage 86 in the protruding end of pin 20 in order to secure the pin. This conically pivotable connection allows some degree of lateral movement during both loading and unloading so that the tow basket lift apparatus will be on the same general plane as the vehicle to be towed. However, the possibility of such lateral movement is eliminated during towing by the weight of the vehicle which creates a downward force on bar 12. Thus, when towing, there is some distance between plate 19 and bar 12, while during loading, on the other hand, a distance is maintained between plate 18 and bar 12.

The unloading process is a simple reversal of the loading process; tow baskets 10, which are maintained in a raised position during towing, are set onto the ground, resting on ground engaging means 22, and pivoting means 46 pivots toward the towed vehicle, releasing the vehicle wheels.

It is to be understood that while the invention has been described in conjunction with the preferred specific embodiment thereof and that the description is intended to illustrate and not limit the scope of the invention, which is defined by the scope of the appended claims.

I claim:

1. An apparatus for lifting and securing the wheel of a vehicle to be towed, comprising:

a tow basket having a front end positionable toward said vehicle, said front end mounted on ground engaging means, and a rearward end, said rearward end mounted on a support shaft;

means for lifting a vehicle wheel onto said tow basket into an initial position and being operatively connected to said ground engaging means and engaged thereby, said lifting means comprising a plurality of rollers, including a first roller rotatably mounted on said front end of said tow baskets and a conveyor belt superposed around said tow basket and operably engaged by said plurality of rollers including said first roller;

pivoting means for carrying said wheel from said initial position into a final position as said wheel is lifted onto said tow basket; and, means for retaining said wheel in said final position.

2. The apparatus of claim 1, wherein said wheel is supported in said initial position by said pivoting means.

3. A towing device for a vehicle, the towing device being attachable to the rear of a tow truck, comprising:

an outer boom extendible from said truck;

a cross bar operatively connected perpendicularly to said outer boom and being conically pivotable, the connection between said outer boom and said cross bar of a construction sufficient to allow for lateral movement during loading of a vehicle to be towed and unloading of the vehicle; and, a tow basket situated at either end of said bar, said basket comprising a front end positionable toward a vehicle to be towed, said front end mounted on ground engaging means, and a rearward end, said rearward end mounted on said cross bar, means for lifting the wheel of a vehicle onto said tow basket into an initial position, pivoting means for carrying said wheel from said initial position into a final position as said wheel is lifted onto said tow basket, and means for retaining said wheel in said second position.

4. A towing device for a vehicle, the towing device being attachable to the rear of a tow truck, comprising:

a pair of tow baskets, each tow basket being mounted on ground engaging means;

means for lifting the wheels of a vehicle to be towed onto the tow baskets into an initial position, the lifting means being operatively connected to the ground engaging means and engaged thereby, the lifting means having a plurality of rollers and conveyor belt associated with each tow basket, each conveyor belt being superposed around a corresponding tow basket and operably engaged by the rollers;

pivoting means for carrying the wheels of a vehicle to be towed from the initial position into a final position as the wheels are lifted onto the tow baskets;

means for retaining the wheels of a vehicle in the final position; and means for attaching the towing device to a tow truck.

* * * * *